Nov. 12, 1963  J. R. OISHEI ETAL  3,110,056
WINDSHIELD WIPER SYSTEM
Filed Jan. 29, 1962  5 Sheets-Sheet 1

INVENTORS
JOHN R. OISHEI,
RAYMOND A. DEIBEL,
MARTIN BITZER and
BY WILLIAM C. RIESTER.

Beau Brooks, Buckley & Beau.
ATTORNEYS

Nov. 12, 1963

J. R. OISHEI ETAL 3,110,056

WINDSHIELD WIPER SYSTEM

Filed Jan. 29, 1962

INVENTORS
JOHN R. OISHEI,
RAYMOND A. DEIBEL,
MARTIN BITZER and
WILLIAM C. RIESTER.

BY Bean Brooks Buckley & Bean

ATTORNEYS

Nov. 12, 1963

J. R. OISHEI ETAL 3,110,056

WINDSHIELD WIPER SYSTEM

Filed Jan. 29, 1962

INVENTORS
JOHN R. OISHEI,
RAYMOND A. DEIBEL,
MARTIN BITZER and
WILLIAM C. RIESTER.

BY Bean Brooks Buckley & Bean.

ATTORNEYS

United States Patent Office 3,110,056
Patented Nov. 12, 1963

3,110,056
WINDSHIELD WIPER SYSTEM
John R. Oishei, Buffalo, Raymond A. Deibel, Cheektowaga, William C. Riester, Williamsville, and Martin Bitzer, Kenmore, N.Y., assignors to Trico Products Corporation, Buffalo, N.Y.
Filed Jan. 29, 1962, Ser. No. 169,318
22 Claims. (Cl. 15—250.12)

The present invention relates to a coordinated control system in an electric powered, improved automatic windshield wiper system, incorporating a new mode of cycling wipers which are selectively operable to either provide continuous operation or to provide intermittent wiper operation of variable frequency.

This new method of controlling the wiping is usable to regulate the wiper cycling with relation to the weather and car speed; also to automatically govern the clearing action by coordination, to more effectively operate the controls to adjust the wipers to the density of moisture impingement and distance traveled between wipes.

Superior vision with the blade action is achieved as a result of confining the oscillating movement to the same velocity obtained either during continuous operation or operation with intervening periods of moisture evaporation gained by stopping the blade's normally continuous wet film spreading—to use the car-created invisible air stream medium as a vision clearing adjunct during rest intervals between cycles of wiper movement.

The various improved wiping results may be achieved with a single constant-speed motor of fixed gear reduction in combination with conventional torque transmitting linkages for wiper arms and blades—gaining better visibility, silencing, eliminating the monotony of constant motion, and minimizing wear.

In our U.S. Patent No. 2,987,747 there is disclosed a wiper system which is selectively operable to either provide conventional continuous wiper operation or to provide intermittent wiper operation with a selective frequency of wiping resulting from a variable rest interval between cycles of wiper movement.

In the instant invention coordination of two wiring circuits serving the motor is provided for automatically shifting from either one to the other, to better match the conditions of traffic and car speeds. This further aid to better vision is desirable not only under conditions of light and medium or moderate precipitation but also when the vehicle windshield is subjected to road spray while it is being driven on wet roadways.

Under the foregoing conditions, the intermittent action is advantageous because it affords relief from monotony of wiper motion and also prolongs the life of the wiper blades, wiper motor and the wiper linkages not only because of their intermittent, rather than constant cycling, but also because the interval accumulation of moisture acts as a lubricant for the wipers. The increased lubrication due to the deposits of moisture on the windshield incidental to intermittent wiping plus the primary advantage of running of the wipers at a constant prescribed velocity eliminates all tendency for the wipers to chatter, thereby not only definitely improving the quality of lesser wiping strokes but also prolonging the life of the rubber because it is not subjected to the wet-dry drag, which normally acts to deteriorate the wiping lip and deposit rubber on the tacky glass surface, thereby forming a condition of regenerative, blade-destroying friction.

Furthermore, the foregoing intermittent action is advantageous in its permitted use of the vehicle-created wind stream to evaporate the film of moisture which is otherwise spread by the wipers on the windshield during constant action to thereby eliminate the vision distorting characteristic of such film which tends to lessen the transparency of the windshield glass.

Selectively varying the period of dwell between cycles of wiper movement can be used to convert a single-speed wiper motor into one capable of providing a variable frequency wipe without the attendant expense of producing a second model such as a two-speed wiper motor of still-limited wiping choice. It is to be especially noted that while the intermittent wiping permits a scattered accumulation of self-suspended droplets of rain on the windshield between successive cycles of wiper movement than with continuous wiping, the fact remains that the windshield glass between such scattered droplets, minus the normally present vision-obscuring film of moisture that has been evaporated therefrom by the vehicle-created windstream, thereby provides better vision despite the existence of such spaced apart droplets than can be obtained through the continuous merging and spreading of drops into a covering of vision-dimming wet film. In short, the use of selective intermittent wiping provides not only improved vision and avoidance of chatter but also economy of operating parts of the system.

It can readily be appreciated that with a constant rate of precipitation, the impingement of rain on the windshield increases as the vehicle speed increases. Furthermore, when the vehicle speed is increased, as in passing another vehicle, there is a deposit on the windshield of not only the rain from normal precipitation, as noted above, but also from being subjected to the wheel spray of the vehicle which is being passed. In order to retain the above noted advantages of intermittent wiping without subjecting the vehicle operator to possible decreased visibility under the foregoing conditions of passing, the present invention incorporates a coordinating arrangement in the wiper motor governor which is automatically operable in response to increasing the engine speed to cause the wipers to operate continuously while the vehicle speed is being increased and during the short period of open engine throttle. After the vehicle returns to its normal cruising speed, the intermittent wiping will automatically be resumed. Thus, the improvement of the present invention automatically provides the motorist with the above-enumerated advantages of intermittent wiping as well as the additional advantage of continuous wiping when it is preferable.

It is accordingly the primary object of the present invention to provide a windshield wiping system which is selectively operable to either provide continuous wiper operation or intermittent wiper operation and is also automatically operable to shift the action of the wiper system from intermittent operation to continuous wiper operation in response to engine acceleration for increasing the speed of the vehicle and thereafter automatically return the wiper system to a condition of intermittent operation after the vehicle is no longer being accelerated. A related object of the present invention is to coordinate the foregoing system in such a manner that it may be shifted automatically from intermittent to continuous operation by an initial depressing of the accelerator pedal, and while the wiper motor is temporarily operating continuously to permit the prolonging of this temporary period of continuous operation by slow return of the pedal and again by the subsequent depressing of the accelerator pedal.

It is another object of the present invention to provide a unitized control system for a windshield wiper system which is capable of producing either continuous wiper operation or intermittent wiper operation, and which has manually presettable control means associated therewith to vary the interval of dwell between cycles of wiper operation when the wiper system is being operated intermittently.

In accordance with one aspect of the present invention, a single selectively operable switch is provided for manual operation by the vehicle operator which may be set to either provide the above noted continuous wiper operation or intermittent wiper operation and may also be set to vary the length of dwell between cycles of wiper operation, to thereby permit the vehicle operator to adjust the amount of dwell to suit or match the vehicle speed with the rate of precipitation. In this respect rotation of a first control knob from its off position to a first detent position provides intermittent wiper operation and the further rotation thereof to a second detent position provides continuous wiper operation. A vernier second control knob can be selectively manipulated by the vehicle operator to vary the period of dwell between successive cycles of wiper operation, to thereby adjust the frequency of wiper operation to various conditions of precipitation, of traffic and car speed.

In accordance with another aspect of the present invention, an automatically operable control is provided to shift the wiper system from a condition of intermittent operation to a condition of continuous operation in response to the acceleration of the vehicle and to maintain this continuous operation for a period of time after the vehicle ceases its acceleration before automatically returning it to a condition of intermittent operation. In a first embodiment, a time delay switch is provided which is adapted to be actuated from the throttle control linkage for causing the wiper system to shift over from intermittent wiper operation to continuous wiper operation in response to the depressing of the accelerator pedal which produces an increase in vehicle speed. In accordance with another embodiment, the above mentioned control for automatically shifting the wiper system from intermittent operation to continuous operation is located under the accelerator pedal and is actuated in response to the depressing of said accelerator pedal. In accordance with a still further embodiment, a foot actuated control is provided on the vehicle floorboard for selective actuation by the vehicle operator, as required.

A further related aspect of the present invention pertains to an intermittent dwell governor including a solenoid actuated switch having normally closed contacts. In response to the setting of the above-mentioned manual control to a position which will provide intermittent wiper motor operation, the intermittent dwell governor automatically establishes the flow of electric current to the wiper motor through said normally closed contacts. However, substantially simultaneously with the establishing of the foregoing circuit to the wiper motor, a solenoid within the intermittent dwell governor is energized through said closed contacts to open said contacts and thereby disrupt the flow of electric current to both the wiper motor and the solenoid. However, the wiper motor will continue to run through one cycle and then automatically stop in its rest position out of the field of vision. A pneumatic time delay is incorporated in the intermittent dwell governor. This time delay includes a chamber having a controlled bleed. By adjusting the rate at which air bleeds back into the chamber through the structure in the above described manual control, the period of dwell will be determined. After air has bled back into the chamber in the dwell governor, the above note contacts will again close to thereby complete an electric circuit to the wiper motor and also simultaneously energize said solenoid to disrupt the flow of current to the electric wiper motor to thereby repeat the foregoing cycle of operation. The foregoing intermittent action continues as long as the manual control is set for intermittent operation, except for the times when the vehicle is accelerated, and, during such times, any form of the above described governors which are coordinated to become responsive to vehicle acceleration, will complete a circuit to the wiper to cause it to operate continuously for a period of time before the acceleration responsive control cuts out and permits the governor to again cause the wiper system to operate intermittently.

In a second and preferred embodiment the intermittent dwell governor operates entirely by pneumatic means, rather than utilizing the solenoid noted above. More specifically, in response to the setting of the manual control for intermittent operation, communication is established between a first chamber in the governor and the engine intake manifold. The setting of the manual control will cause a circuit to be established to the wiper motor through normally closed contacts in the governor. In this manner the wiper motor will be started. However, as soon as said first chamber is subjected to engine intake manifold vacuum, a diaphragm within the dwell governor will be moved to cause the opening of said contacts to thereby disrupt the flow of electric current to said wiper motor. However, the wiper motor will continue to operate for one cycle through its cut-off circuit. When the diaphragm within the dwell governor has moved within a predetermined range, it will actuate a slide valve to vent said first chamber whereupon said diaphragm will return to its original position. However, its rate of movement is determined by the length of time which is required for air to bleed from a second chamber on the opposite side of said diaphragm from said first chamber. This length of time determines the rest period of the wiper at the end of its travel. After the diaphragm has returned to its original position, the above noted contacts will again close to complete an electric circuit to the wiper motor to thereby energize it. Furthermore, substantially simultaneously with the closing of said contacts, the slide valve which is actuated by said diaphragm will shift to again place said first chamber in communication with the engine intake manifold whereupon the above cycle will again be repeated. The foregoing action continues as long as the vehicle is being driven at a relatively restricted car rolling speed. However, when the vehicle is accelerated, a manifold vacuum responsive valve vents both chambers in said control to cause the switch contacts of said intermittent governor to remain closed and thereby cause continuous wiper motor operation for the length of time that said vehicle is accelerated. A time delay associated with the governor maintains continuous wiper motor operation for a time after the vehicle is no longer being accelerated. Thereafter the control will return to a condition of automatic intermittent operation described above. It will be understood that this second and preferred embodiment of the intermittent control can be modified to be actuated by any of the linkages described above for shifting the system from continuous to intermittent operation and need not be responsive solely to the action of the engine intake manifold.

The pneumatically-operated governor and selector control are designed (1) to provide primary switch control for the motor and gearing, for driving the wiper at a predetermined, substantially constant cycling velocity; (2) to optionally operate the wiper motor intermittently with intervening rest intervals that are presettable and substantially uniform; (3) to maintain wiper operation at a fixed velocity during the cycling periods—whether constant or intermittent; (4) to make selectively adjustable the duration of the dwell in the rest periods; (5) to coordinate the auxiliary control for intermittent wiping with the primary wiper motor control—to automatically increase the frequency of wiper blade operation; (6) to gear the coordinated, automatically increased frequency to shift during engine acceleration incidental to higher speed of car travel; and (7) to optionally set the wiper motor control for constant cycling, without altering the prior frequency timing, preset in the intermittent circuit control.

All aspects of the present invention will be more fully understood when the following portions of the specification are read in conjunction with the accompanying drawings wherein.

Figure 1:
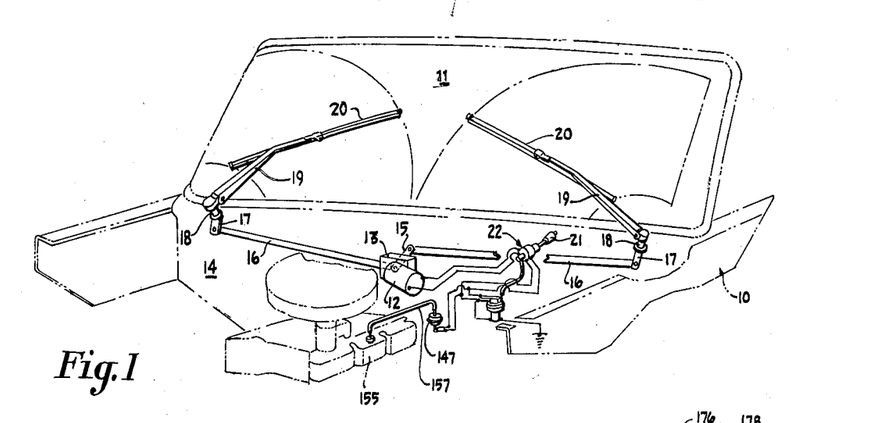
FIG. 1 is a fragmentary perspective view of an automotive vehicle showing one embodiment of the instant invention.

Reference is now made to FIG. 1 wherein an automotive vehicle 10 is shown having a windshield 11 mounted thereon in the conventional manner. A windshield wiper motor 12, having a gear reducer 13, is mounted on the fire wall 14 of the vehicle. The gear reducer has a crankarm 15 operatively coupled thereto which in turn is pivotally connected at the opposite ends thereof to the inner ends of elongated links 16, the outer ends of which are pivotally connected to crankarms 17 mounted at the inner ends of rockshafts 18 which are journalled in the cowl of the vehicle and have wiper arms 19 mounted at their outer ends, the wiper arms each carrying wipers 20. As is well understood in the art, when the wiper motor 12 is energized, wipers 20 will be oscillated across the windshield to clear moisture therefrom.

Figure 6:
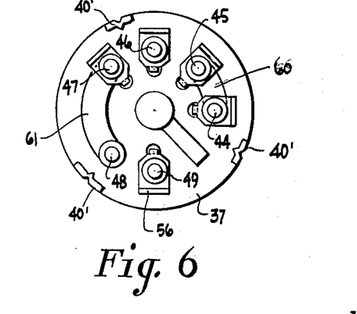
FIG. 6 is an end view of the control taken along line VI—VI of FIG. 3.
Figure 8:
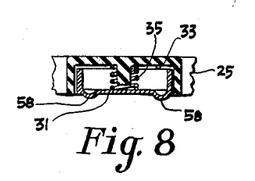
FIG. 8 is a view of the contacts shown in the portion of the switch of FIG. 4 and taken along line VIII—VIII thereof.
Figure 9:
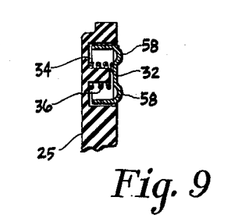
FIG. 9 is a cross sectional view of a portion of the switch shown in FIG. 4 and taken along line IX—IX thereof.

In order to cause the wiper motor 12 to operate, it is merely necessary to rotate knob 21 of control switch 22. Knob 21 is pressed onto sleeve 23 (FIG. 3) which in turn is held on stem 24 by set screw 25'. Therefore, as knob 21 is rotated there is corresponding rotation of stem 24. Pressed onto the end of stem 24 which is remote from knob 21 is a sleeve 25 which in turn has contact carrying plate 26 slidably keyed thereto by keys 27 (FIG. 4) engaged in keyways 28 in sleeve 25. A spring 29 is located between the hub of plate 26 and shoulder 30 on sleeve 25 to bias said plate to the right in FIG. 3. Contact carrying plate 26 is made of plastic for its insulating qualities and carries contacts 31 and 32 thereon (FIGS. 8 and 9). Contacts 31 and 32 are dished conductive metallic members which are housed in recesses 33 and 34, respectively, in contact carrying plate 26 and are biased outwardly from said plate by springs 35 and 36, respectively. The switch 22 also includes a base plate 37 of insulating material which supports switch housing 39 which is staked thereto, notches 40 (FIG. 5) in base 37 receiving the staked-over portions 40' (FIG. 6) of housing 39. The housing has a threaded portion 41 which fits through a suitable aperture in a vehicle dashboard and receives a nut 42 which secures the housing 39 by clamping the dashboard between nut 42 and shoulder 43 of the housing.

Figures 2, 4, 5:
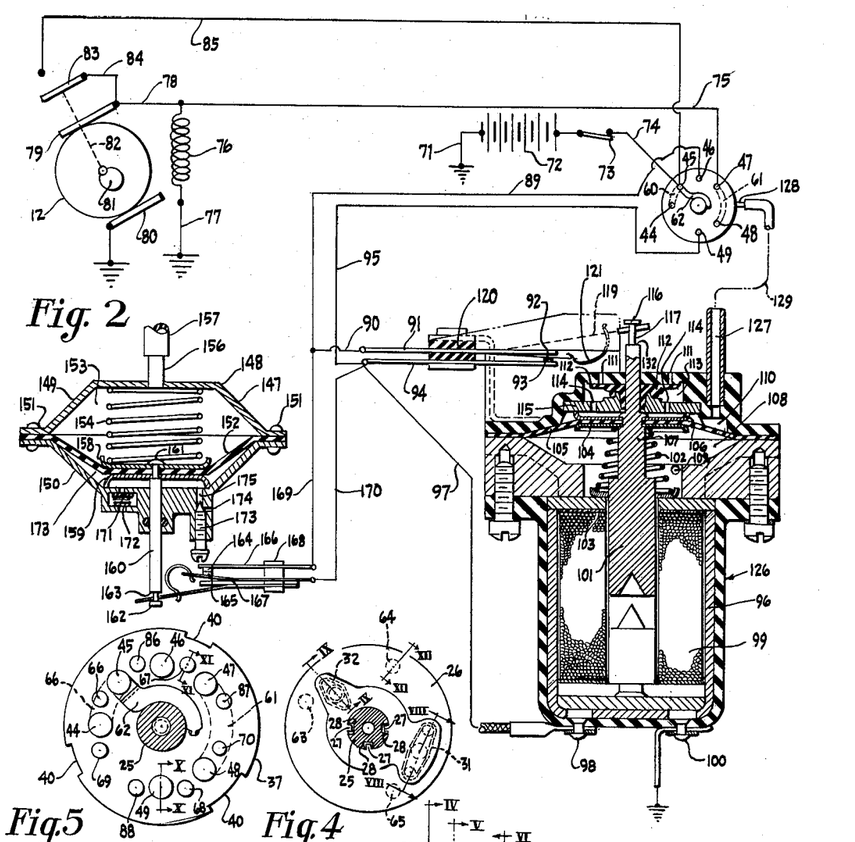
FIG. 2 is a schematic diagram of the modification of the invention shown in FIG. 1 with certain elements thereof shown in cross section.
FIG. 4 is a view taken along line IV—IV of FIG. 3.
FIG. 5 is a view taken along line V—V of FIG. 3.
Figure 10:
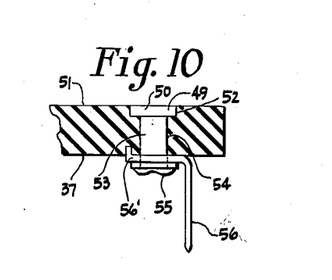
FIG. 10 is a detailed view taken along line X—X of FIG. 5 showing the construction of the contacts of the switch.

Base plate 37 has metallic contacts 44, 45, 46, 47, 48 and 49 imbedded therein in the manner shown in FIGS. 5 and 10. The outer side of the enlarged head portion 50 of each contact (FIG. 10) is flush with the surface 51 of base plate 37 and fits into an enlarged bore 52 in said base plate. The stem 53 of contact 49 fits in a reduced bore 54 and the end 55 of contact 49 is deformed about and preferably soldered to the base 56' of prong 56, which is for receiving electrical connecting elements, not shown, secured to the electric leads of the wiper system. While contact 49 has been described in detail, it is to be understood that contacts 44—48 are of identical construction and, therefore, will not be described in detail.

Spring 29, noted above, which is located between contact carrying plate 26 and shoulder 30 of sleeve 25, in conjunction with spring 57, which is located between shoulder 58 on stem 24 and shoulder 59 on housing 39, urge contact carrying plate 26 to the right to insure good contact between the contacts on contact carrying plate 26 and certain of contacts 44—49 imbedded in base plate 37, depending on the relative positions of plates 26 and 37. It is to be especially noted that contacts 31 and 32 have the outer surfaces thereof formed into projections 58 for providing good contact with the other contacts with which they are in selective engagement.

Base plate 37 has bus bar 60 bridging contacts 44 and 45 (FIG. 5) and bus bar 61 bridging contacts 47 and 48. As can be seen from FIGS. 5 and 6, these bus bars are on the rear of base plate 37. Furthermore, a contactor strip 62 has one end thereof connected to contact 45 and the other end thereof formed into an arcuate shape for engagement with contact 32 of contact carrying plate 26, as described more fully hereafter.

Figure 11:
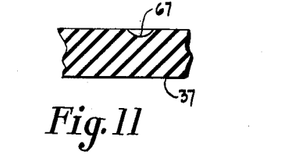
FIG. 11 is a view taken along line XI—XI of FIG. 5 and showing the depression for receiving the detents in the switch.
Figure 12:
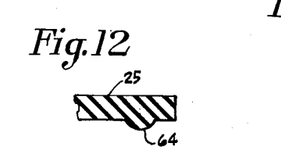
FIG. 12 is a view taken along line XII—XII of FIG. 4 and showing the detents of the switch.

When switch 22 is in a parking position, projections 63, 64, and 65 of contact carrying plate 26 are in engagement with pockets 66, 67, and 68, respectively, of base plate 37. (This can be visualized by superimposing FIG. 4 over FIG. 5). The construction of projection 64 and pocket 67 are shown in FIGS. 11 and 12, respectively, and the other projections and pockets referred to have identical construction. When the contact carrying plate 26 and base plate 37 are in the foregoing orientation, contact 32 merely engages contact 45 and contactor 31 merely engages contact 48, but there is no completion of an electrical circuit for energizing the motor. The relative positions of the various contacts and bus bars with respect to the leads connected to switch 22 are shown in schematic diagram of FIG. 18.

Figure 17:
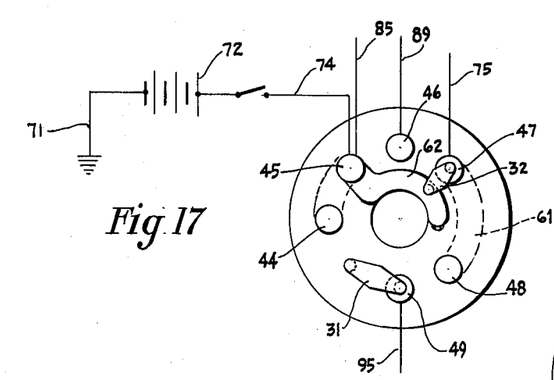
FIG. 17 is a schematic view showing the positions occupied by the elements of the control switch of FIG. 3 when it is placed in a condition to provide continuous running.

When it is desired to cause the wiper motor to run continuously, knob 21 is rotated in a manner so as to cause contact carrying plate 26 to rotate a full 90° until projection 63 (FIG. 4) thereon engages pocket 67 of base plate 37. At this time projection 65 will be in engagement with pocket 69 and projection 64 will be in engagement with pocket 70. Furthermore, contact 32 will bridge contact 47 and contactor bar 62, while contact 31 will be in contact with contact 49. The foregoing electrical connections are clearly shown in the schematic diagram of FIG. 17. From FIGS. 2 and 17 it can be seen that a circuit will be completed from ground through lead 71, battery 72, ignition switch 73, lead 74, contact 45, contactor bar 62, contact 32, contact 47, lead 75, motor winding 76, lead 77 and back to ground. Also current will flow through lead 78, wiper motor brushes 79 and 80 back to ground to cause wiper motor 12 to operate in a well known manner.

Figure 18:
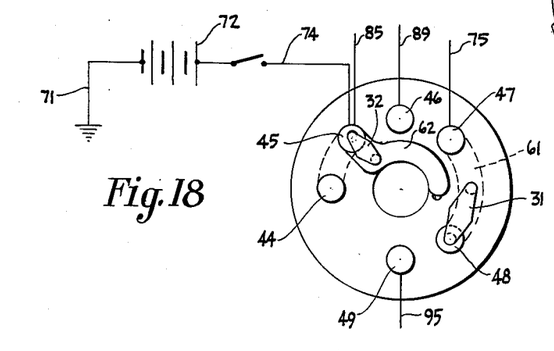
FIG. 18 is a schematic view showing the positions occupied by the elements of the control switch of FIG. 3 when it is placed in a condition to park the wiper motor.

When it is desired to stop the wiper motor, the control knob 21 of switch 22 is rotated to cause the various contacts to return to positions shown in schematic FIG. 18. However, the wiper motor will run until the wipers 20 return to a position of rest adjacent the bottom edge of the windshield. The foregoing occurs because a cam 81 (FIG. 2) on the wiper motor drive shaft actuates a linkage 82 which closes switch 83 to thereby bridge leads 84 and 85 when the wiper motor is not in its stopped position. It will readily be appreciated, therefore, that when switch 83 is closed, a circuit will be completed from ground through lead 71, battery 72, ignition switch 73, lead 74, contact 45, lead 85, switch 83, lead 84, lead 78, motor winding 76 and lead 77 to ground. Furthermore, current will flow from lead 84 through the wiper motor brushes 79 and 80 to ground. The foregoing electrical path remains completed until such time as cam 81 returns to the position shown in FIG. 2, wherein switch 83 will open and, therefore, disrupt the flow of current to wiper motor.

Figure 13:
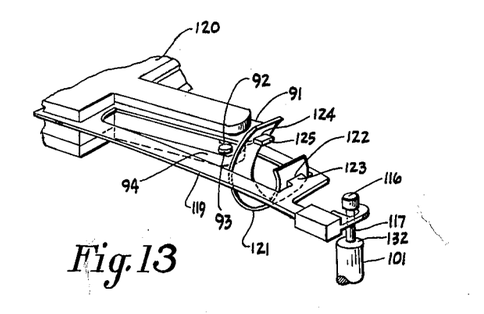
FIG. 13 is a fragmentary perspective view of an over-center switch which is used for providing intermittent wiper operation shown in FIG. 2.

When it is desired to operate the wiper motor intermittently during conditions of light to medium precipitation or when the vehicle is being driven on a wet pavement, it is only necessary to rotate knob 21 of control switch 22 to its first detent position wherein projections 63, 64, and 65 of contact carrying plate 26 are in engagement with pockets 86, 87, and 88, respectively, of base plate 37 (see FIGS. 4 and 5). When switch 22 is in the foregoing position, the electrical contact will assume the position shown in schematic FIG. 19, wherein contact 32 of contact carrying plate 26 will bridge contactor bar 62 and contact 46, and wherein contact 31 will bridge contacts 48 and 49. Immediately following the positioning of switch 22 for intermittent wiper operation, the following circuits are completed. First of all from FIGS. 19 and 2 it can be seen that a circuit is completed from ground through lead 71, battery 72, ignition switch 73, lead 74, contact 45, contactor bar 62, contact 32, contact 46, lead 89, lead 90, switch arm 91, contact 92 at the end of switch arm 91, contact 93 at the end of switch arm 94, switch arm 94, lead 95, contact 49, contact 31, contact 48, bus bar 61, lead 75, and thence through wiper motor winding 76 and lead 77 to ground and also from lead 75 to lead 78 and wiper motor brushes 79 and 80 to ground. It will also be noted that simultaneously with the completion of the foregoing circuit, a circuit is also completed from the end of switch arm 94 to solenoid 96 through lead 97, contact 98, solenoid winding 99 and contact 100 to ground. The energization of solenoid 96 will cause solenoid armature 101 to be pulled downwardly against the bias of spring 102, which is interposed between plate 103 in the solenoid housing and disc washer 104 bearing against resilient flexible diaphragm 105. It is also to be noted that washer 104 and washer 106 grip the central portion of diaphragm 105 between them, and that these washers are fixed in position by suitable shoulder (not numbered) on the shaft portion 107 of the armature 101. The air which is in chamber 108 below diaphragm 105 will be expelled to the atmosphere through vent 109 during the foregoing downward movement of armature 101. Furthermore, as the armature 101 moves downwardly, atmospheric air will bleed into chamber 110 above diaphragm 105 through vents 111, because the outer edge portions of gland seal 112 will deflect due to the reduction of atmospheric pressure in chamber 110, which accompanies the downward movement of diaphragm 105. Furthermore, after passing through vents 111, the atmospheric air will pass into chamber 113 and through apertures 114 in plate 115 prior to going into chamber 110 above diaphragm 105. The outer end of armature 101 is headed at 116 with a reduced diameter portion 117 connecting such headed portion to the remainder of the armature. Thus, the downward movement of armature 101, when solenoid 96 is energized, will be accompanied by downward movement of headed portion 116 which engages switch arm 119 (FIG. 13) which is made of spring material. As can be seen from FIG. 13, switch arm 119 forms a part of overcenter switch 120, which also mounts switch arms 91 and 94, mounting contacts 92 and 93, respectively. An overcenter spring 121 (FIG. 13) has a slot 122 at one end thereof receiving projection 123 on switch arm 119. The other end of spring 121 has a slot 124 which receives projection 125 at the end of switch arm 91. After a predetermined amount of downward movement of switch arm 119 has been experienced in response to energization of solenoid 96, overcenter spring 121 will operate to snap switch arm 91 upwardly to the position shown in FIG. 13 and, therefore, cause contact 92 on spring switch arm 91 to move upwardly with the latter out of engagement with contact 93 which is mounted on switch arm 94 which is rigid. Thus, the circuit through solenoid 96 will be broken by the above described overcenter action.

It will readily be appreciated from the foregoing description that after contacts 92 and 93 of switch arms 91 and 94, respectively, separate, the above-described circuit to wiper motor 12 will be broken inasmuch as this circuit is maintained only through contacts 92 and 93 when the wiper motor is initially placed in operation. However, the wiper motor will continue to run for one full cycle until such time as the wipers 20 return to their starting position, because the above described circuit including cam 81, linkage 82 and switch 83 will cause current to continue to flow to the wiper motor through the circuit until the wiper motor opens the circuit. When switch 83 is opened, the wiper motor will remain in its off position until it is again energized.

Figure 21:
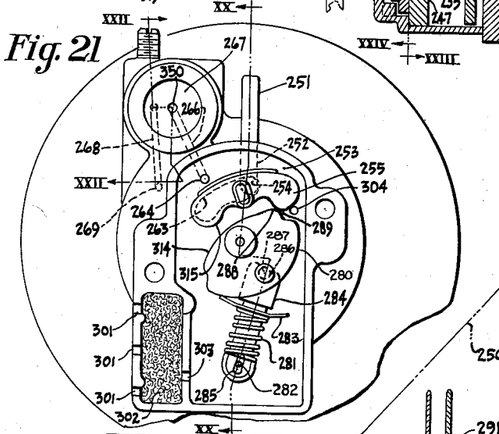
FIG. 21 is a plan view of the intermittent dwell control of FIG. 20.
Figure 23:
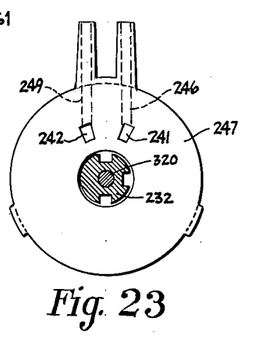
FIG. 23 is a view of the valve structure taken along line XXIII—XXIII of FIG. 20.
Figure 24:
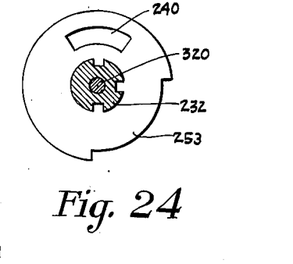
FIG. 24 is a view taken along line XXIV—XXIV of FIG. 20.

After a period of wiper dwell at the end position, the wiper motor circuit will be again energized in the following manner. Spring 102 of intermittent dwell governor 126, which was compressed by the downward movement of solenoid armature 101, will be permitted to expand after solenoid 96 is de-energized by the opening of contacts 92 and 93. However, this expansion is at a controlled rate because gland seal 112 is closed in response to the build up of pressure in chambers 110 and 113 of intermittent governor 126. The air which is compressed in chamber 110 is forced into nipple 127 which is connected to nipple 128 (FIG. 3) of control 22 through conduit 129. Nipple 128 forms a part of control switch 22 and the compressed air in chamber 110 of intermittent governor 126 is therefore forced through opening 130 in control switch 22 and through vent 131 to the atmosphere. The length of time which it takes for the spring 102 to expand to its position shown in FIG. 21 determines the length of time that contacts 92 and 93 will be open. After armature 101 has moved upwardly a sufficient distance, shoulder 132 (FIG. 13) will engage the undersurface of the end of switch arm 119 and move it upwardly until such time as overcenter switch 121 (FIG. 13) causes switch arm 91 to snap downwardly and thereby close contacts 92 and 93. After contacts 92 and 93 are closed, the above described cycle of operation will again be repeated, namely, the completion of an electric circuit through wiper motor 12 and the energization of solenoid 96. It is deemed that these circuits need not be described in detail again at this point inasmuch as they are described in detail above. Thus, the foregoing structure provides a cycle of wiper motor operation which is followed by a period of wiper motor dwell before the wiper motor is again automatically energized.

Figure 3:
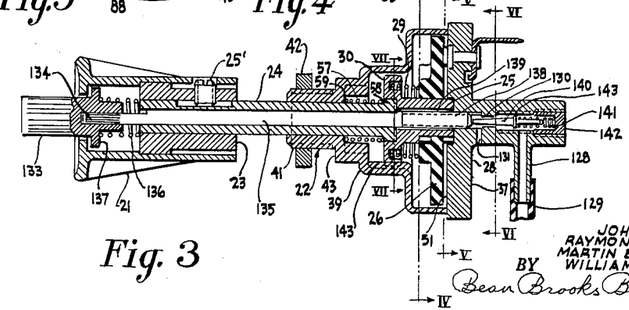
FIG. 3 is a view in cross section of the unitary control switch of the present invention.

In accordance with the present invention, the wiper motor control 22 possesses structure for varying the length of dwell at the end of each cycle of intermittent wiper movement. In this respect, a knob 133 is provided on the wiper motor control 22 (FIG. 3). This knob is fixedly mounted on the end 134 of shaft 135 which is rotatable within stem 24. A spring 136 is interposed between shoulder 137 of knob 133 and one end of stem 24. This spring merely takes up play in the control. The end of shaft 135 which is remote from end 134 is threaded at 138 and this threaded portion fits into tapped portion 139 of sleeve 25. A metering valve 140 is tapered at the end thereof which fits within aperture 130 of valve 22. A spring 141 is interposed between plug 142 of valve 22 and shoulder 143 of metering pin 140. The end of the metering pin 140 abuts the end of shaft 135 and is separate therefrom. It will readily be appreciated that by rotating knob 133 of control 22, longitudinal movement of shaft 135 is obtained to thereby cause metering pin 140 to vary the rate of flow of compressed air through aperture 130. By selectively metering the rate of air flow through aperture 130, the length of dwell of the wiper motor between successive cycles of operation can be adjusted to meet varying conditions of precipitation. In other words, if the rain is relatively heavy, metering pin 140 is backed off to cause a greater rate of air flow through aperture 130, thereby decreasing the period of dwell at the end of each cycle of motor operation. On the other hand, if the rate of precipitation is relatively low, knob 133 is adjusted to cause a relatively small opening between metering pin 140 and aperture 130 to thereby lengthen the interval of dwell at the end of each cycle of wiper motor operation.

Figure 7:
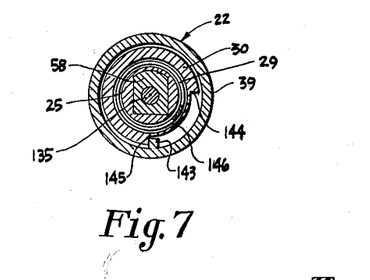
FIG. 7 is a cross-sectional view taken along line VII—VII of FIG. 3.

It is to be noted at this point (from FIG. 7) that the housing 39 of switch 22 contains a positive stop 143 formed integrally therewith for limiting movement of control knob 21 to a total of 90° because abutments 144 and 145 are provided at the ends of cut-away portion 146 of shoulder 30 of sleeve 25. The foregoing stop arrangement prevents a vehicle operator from manipulating the control switch 22 in any other manner than is necessary for proper operation thereof.

It will readily be appreciated that there are times while the intermittent type of operation, described above, is being used that the vehicle windshield has increased amounts of moisture deposited thereon, notwithstanding that the rate of precipitation does not vary. More specifically, when the vehicle speed is increased, moisture is deposited on the windshield at a greater rate. Furthermore, when the vehicle speed is increased to pass another vehicle, the wheel spray from said other vehicle is also deposited on the windshield. During the foregoing conditions of vehicle acceleration, it is desirable that the wiper motor operate continuously to insure good visibility. In accordance with the present invention, the following structure is provided for shifting the wiper system from a condition of intermittent operation to a condition of continuous operation for the length of time that the vehicle is being accelerated, and for a short period thereafter to thereby insure complete cleaning of the vehicle windshield. After this short period terminates, the wiper system will automatically return to a condition of intermittent operation.

In FIGS. 1 and 2, one form of the present invention for achieving the above noted objective is disclosed. More specifically, a manifold vacuum responsive control 147 (FIGS. 1 and 2) is provided for shifting the wiper system from intermittent operation to continuous operation in response to a drop in manifold vacuum which necessarily accompanies vehicle acceleration. Control 147 includes a housing 148 formed of two halves 149 and 150 which are suitably secured together as by rivets 151 with a resilient flexible diaphragm 152 sandwiched therebetween. In chamber 153 above diaphragm 152 there is a spring 154 tending to bias diaphragm 152 downwardly. Chamber 153 is connected to the engine intake manifold 155 (FIG. 1) through nipple 156 and conduit 157. When the vehicle engine is not being accelerated, there will be high manifold vacuum and diaphragm 152 will be pulled upwardly from its position shown in FIG. 2 against the bias of spring 154. Attached to diaphragm 152 by plates 158 and 159 is a shaft 160 which is secured to plates 158 and 159 by bent-over head 161 and a shoulder (not numbered) on shaft 160. When chamber 153 of control 147 is subjected to high manifold vacuum as when the vehicle is not being accelerated, shaft 160 will have followed diaphragm 152 to its uppermost position, opposite to that shown in the drawing, FIG. 2. An overcenter switch, which may be identical in construction to the overcenter switch described above in FIG. 13, is secured between a headed portion 162 of shaft 160 and shoulder 163 thereof. When there is high manifold vacuum, contacts 164 and 165 on switch arms 166 and 167 of switch 168 will be separated, and therefore there will be no flow of current through leads 169 and 170. Therefore intermittent governor 126 will operate in the manner described in detail above.

Figure 19:
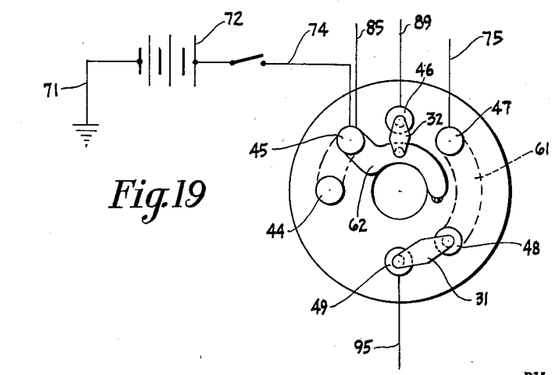
FIG. 19 is a schematic view showing the positions occupied by the elements of the control switch of FIG. 3 when it is placed in a condition to provide intermittent operation.

Assuming that the wiper system has been set for intermittent operation with the electrical contacts of switch 22 in the position shown in FIG. 19, and further assuming that the wiper system is experiencing a dwell period with the wipers at rest when the vehicle is accelerated, the loss of manifold vacuum will be communicated to chamber 153 of control 147 through conduit 157; and spring 154 will therefore expand to move diaphragm 152 back to the position shown in FIG. 2. A check valve, including a valve element 171 and a spring 172 biasing it to a normally closed position, releases when spring 154 expands to permit immediate dumping of the air in chamber 173 below diaphragm 152. Upon downward movement of shaft 160 which accompanies downward movement of diaphragm 152, overcenter switch 168 will return to the position shown in FIG. 2, wherein contacts 164 and 165 will close. This will complete a circuit to the wiper motor which bypasses the open contacts 92 and 93, the latter being open because the governor 126 has opened them to provide a dwell period. Therefore, notwithstanding that governor 126 has caused the wiper system to return to a dwell period, there will be a circuit immediately completed to the wiper motor from ground through lead 71, battery 72, ignition switch 73, lead 74, contact 45, contactor bar 62, contactor 32, contact 46, lead 89, lead 169, switch arm 166, contact 164, contact 165, switch arm 167, lead 170, lead 95, contact 49, contactor 31, contact 48, bus bar 61, contact 47, lead 75, and thence through the parallel circuits comprising motor winding 76 and lead 77 to ground, and also through armature brushes 79 and 80 to ground.

It will also be noted that when switch contacts 164 and 165 of control 147 are closed, the circuit is completed through solenoid winding 99 to thereby maintain contacts 92 and 93 open. As long as there is low manifold vacuum, contacts 164 and 165 of overcenter switch 168 will be closed to provide continuous wiper motor operation through the above described circuit. It will further be noted that the continuous wiping through the above described circuit will prevail for the time interval after the manifold vacuum has returned to its normal high value, because of the following structure incorporated into control 147. A metering pin 173 is threadably engaged in the lower half 150 of the control housing for permitting the atmosphere to return to chamber 173 below diaphragm 152 at a controlled rate, considering that as soon as diaphragm 152 tends to move upwardly under the influence of high manifold vacuum, check valve 171 will be closed. Therefore, the length of time which it takes diaphragm 152 to return from its lowermost position (shown in FIG. 2) to an uppermost position is determined by the length of time that it will take air to bleed from the atmosphere through aperture 174 and conduit 175. This rate can be set by an adjustment of metering pin 173. After diaphragm 152 has moved upwardly a predetermined amount, overcenter switch 168 will open and contacts 165 and 164 will separate to thereby open the above described circuit to wiper motor 12. Thereafter, the circuit to the solenoid winding 199 will also be broken and solenoid armature 101 will return from its lowermost position which it occupied when said winding was energized to its uppermost postion wherein it moves switch 120 to cause contacts 92 and 93 to close. Upon closure of contacts 92 and 93, a circuit will be completed to the wiper motor 12, as described in detail above, to cause said wiper motor to provide one cycle of wiper motor operation, and thereafter provide a rest interval until said contacts 92 and 93 again close in the above described manner. Thus, control 147, in response to a drop in manifold vacuum which accompanies vehicle acceleration causes the wiper system to shift from a condition of intermittent operation to a condition of continuous operation and maintain this condition of continuous operation for a time interval after the vehicle is no longer being accelerated, to thereby insure that the vehicle operator has a maximum visibility whenever the vehicle windshield is subjected to increased accumulations of moisture.

Figures 14, 15, 16:
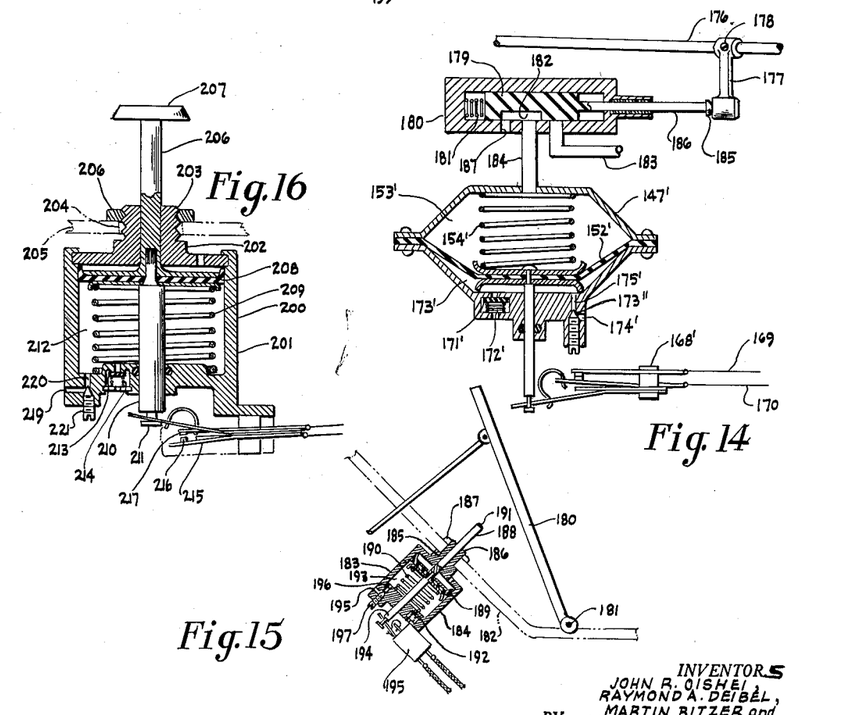
FIG. 14 is a cross sectional view showing an alternate embodiment of the invention for shifting the wiper system from intermittent operation to continuous operation.
FIG. 15 is a view partially in cross section showing an alternate modification of the present invention.
FIG. 16 is another view showing another modification of the instant invention.

An alternate embodiment of the present invention is depicted in FIG. 14. This embodiment is actuated in response to a predetermined movement of the throttle linkage rather than being actuated directly by manifold vacuum. A control 147' is provided which may be identical in construction to control 147, described in detail above in FIG. 2. A detailed description of this control will therefore not be given here. In this embodiment, throttle linkage 176 has a dog 177 attached thereto as by set screw 178. A slide valve 179 is mounted in housing 180 and tends to be biased by spring 181 to the right so that groove 182 therein normally effects communication between conduit 183, leading from the engine intake manifold and conduit 184 in communication with chamber 153', when the vehicle is not being accelerated. Therefore, during the above position of slide valve groove 182, conduits 183 and 184 will be in communication so that diaphragm 152' of control 147' will occupy its uppermost position remote from the position shown in FIG. 14 against the bias of spring 154'. When the accelerator pedal is depressed so that throttle linkage 176 moves sufficiently to the left in FIG. 14, dog 177 will engage slide valve stem head 185 and move slide valve 179 to the left against a bias of spring 181 so that slide valve 179 will occupy the position shown in FIG. 14, wherein groove 182 therein effects communication between conduit 184 and the atmosphere through vent aperture 187. As soon as control valve 147' is vented to the atmosphere through aperture 187, spring 154' therein will immediately expand and move diaphragm 152' back to the position shown in FIG. 14. This downward movement is unimpeded by the air in chamber 173' below diaphragm 152, because check valve element 171' will open against the bias of spring 172'. The switch 168' is identical in construction to the switch 168 of FIG. 2, and will complete a circuit through leads 169 and 170 which bypasses the open contacts 92 and 93 of switch 126. As long as the accelerator is depressed, continuous wiper operation will be obtained. After the accelerator is no longer depressed, valve 179 (FIG. 14) will return to a position wherein it bridges conduits 183 and 184, to permit manifold vacuum to move diaphragm 152' upwardly against a bias of 154' at a rate which is controlled by the length of time which it takes air to meter into chamber 173' through aperture 174', past metering valve 173" and conduit 175'. It is to be noted that valve 173" contains a threaded portion which permits it to be adjusted to thereby set the length of time that continuous wiper motor operation will continue before intermittent operation is again resumed.

In FIG. 15 a still further embodiment of the present invention is shown which effects shifting of the wiper system from a condition of intermittent operation to a condition of continuous operation in response to the depressing of accelerator pedal 180, which is pivotally mounted at 181 to floorboard 182 of the vehicle. Attached to floorboard 182 is a control unit 183 having a housing 184 with a neck 185 and a threaded end 186, which fits through an aperture (not numbered) in floorboard 182. A nut 187 threads onto neck 186 to secure control unit 183 to the floorboard between shoulder 185 and nut 186. The control unit 183 has a shaft 188 having piston 189 mounted thereon within housing 184. A spring 190 normally biases piston 189 to the position shown in FIG. 15. When accelerator pedal 180 is depressed a sufficient amount, it will engage the end of 191 of shaft 188 and thereby move piston 189 downwardly against the bias of spring 190. A spring-biased check valve 192 will open in response to the compression of air in chamber 193. Stem 194 is also affixed to piston 189 and has at the outer end thereof mechanism for closing the contacts (not shown) of overcenter switch 195 which may be identical in construction to the overcenter switch in FIG. 13. When contacts of overcenter switch 195 close, a circuit will be completed to the wiper motor to cause it to operate continuously, this circuit being identical to the circuit shown in FIG. 2. After the accelerator pedal is released, it will return to the position shown in FIG. 15, and piston 180 of control unit 183 will return to the position shown in FIG. 15 under the urge of spring 190 at a controlled rate of speed, depending on the length of time it takes atmospheric air to bleed into chamber 193 through conduits 195 and 196, which are separated by the end of adjustable metering pin 197. It will be appreciated that metering pin 197 is threaded into position, and the loosening or tightening thereof will determine the amount of time required for the piston to return to the position shown in the drawings to thereby disrupt the flow of current to the electric wiper motor upon the opening of the contact of switch 195. Thus, the wiper motor will be caused to run continuously for a short period of time after the vehicle is no longer being accelerated, to thereby insure optimum visibility.

A still further embodiment of the present invention is disclosed in FIG. 16. In this embodiment a control unit 200 has a housing 201 with a shoulder 202 terminating in threaded end 203 which fits through aperture 204 in the vehicle floorboard 205. Threaded end 203 has a nut 206 threaded thereon to secure said housing 200 to the floorboard by sandwiching it between shoulder 202 and nut 206. This embodiment of the invention is adapted to provide a period of continuous wiper operation while the wiper system is set for intermittent operation when the vehicle operator depresses valve stem 206 by pressing thereon with his foot. Valve stem 206 has a head portion 207 for receiving the foot of the vehicle operator and carries a piston 208 within housing 201. The control unit is normally biased to the position shown in FIG. 16 by spring 209. The piston 208 also carries a stem 210 which terminates in headed portion 211. When the stem 206 is depressed, the air in chamber 212 will be released to the atmosphere by the unseating of check valve 213 against the bias of spring 214. When piston 208 reaches its lowermost position, the overcenter switch mechanism 215 will cause contacts 216 and 217 to close to thereby cause an electrical circuit to be completed to the wiper motor, in the manner described above, with respect to FIG. 2. The contacts will remain closed and the wiper motor will therefore operate continuously as long as valve stem 206 remains depressed, thereby permitting the operator to maintain continuous operation for as long as he desires. After the vehicle operator removes his foot from head 207 of valve stem 206, contacts 216 and 217 will remain closed until such time as piston 208 returns to its position shown in FIG. 16 under the urging of spring 209. The length of time it takes for this return depends on the rate at which air flows into chamber 212 through conduits 219 and 220, which are separated by metering pin 221, which may be adjusted for any desired rate of air flow. It will be appreciated that check valve 213 will be closed under the urging of spring 214 during the upward stroke of piston 208 during the expansion of spring 209. With the embodiment shown in FIG. 16, the vehicle operator may shift the wiper system from intermittent to continuous operation whenever he so desires regardless of the operational condition of the vehicle.

Figures 20, 22:
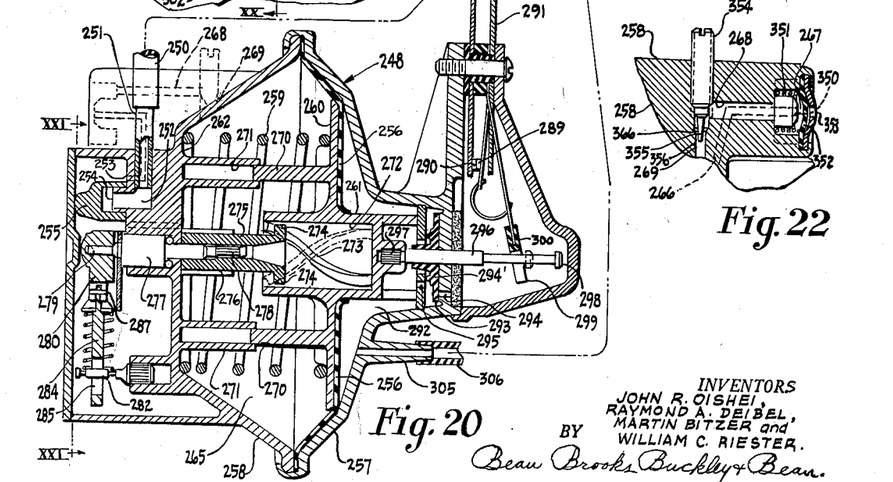
FIG. 20 is a view of a system which functions in the same manner as the embodiment of FIG. 2 except that the timing of the intermittent dwell is achieved entirely pneumatically rather than electrically and pneumatically, this figure having portions thereof in cross section and other portions thereof indicated schematically in the interest of clarity, a portion of FIG. 20 being taken along line XX—XX of FIG. 21.
FIG. 22 is a view of the pressure regulating mechanism taken along line XXII—XXII of FIG. 21.

Reference is now made to FIG. 20 which depicts a system for providing intermittent wiper operation and for shifting from intermittent operation to continuous wiper motor operation in response to the acceleration of the vehicle. In this system, both the intermittent operation and the shifting from intermittent to continuous operation is effected entirely by pneumatic means. A manual control 230 is provided for selective manipulation of the vehicle operator. This control is used for either causing the wiper motor to operate intermittently, continuously, or to shut it off. Control 230 includes a control knob 231 which is in engagement with shaft 232 through set screw 233. The rotation of knob 231 will cause a corresponding rotation of contactor carrying plate 233 which is mounted on the end thereof opposite to knob 31. Contactor carrying plate 233 may be identical in all respects to contactor carrying plate 26 and may be mounted on shaft 232 in the same manner. A spring 234 which is interposed between the hub 235 of contactor carrying plate and shoulder 236 in housing 237 biases contactor carrying plate 233 to the right to effect good electric connection with the base plate 234' which is secured to housing 237 in the same manner as described above relative to analogous parts shown in FIG. 3. The rotation of knob 231 to a predetermined detent position will effect continuous wiper motor operation in the same manner as described above with respect to FIGS. 2 and 3 and it is deemed that a repetition of this subject matter is not necessary at this point.

The rotation of knob 231 to another predetermined position will effect intermittent wiper motor operation in the following manner. Valve element 238 which is pressed onto shoulder 239 of shaft 232 has a groove 240 therein which bridges apertures 241 and 242. Aperture 241 is in communication with the engine intake manifold through conduit 242', conduit 243 in valve 244, conduit 245, and conduit 246 in valve seat 247. Aperture 242 is in communication with the intermittent governor unit 248 through conduit 249 in valve seat 247 and conduit 250 which is mounted on nipple 251 of said intermittent governor unit. When valve 238 is moved to the position wherein groove 240 therein bridges apertures 241 and 242 in valve seat 247, there will be communication between conduit 242' leading from the engine intake manifold and nipple 251 of the intermittent governor unit 248. Nipple 251 is in communication with conduit 252 in valve seat 253 and terminates at aperture 254 which lies under slide valve 255. When flexible diaphragm 256 which is clamped between housing portions 257 and 258, is in the position shown in FIG. 20 due to the expansion of spring 259 which is interposed between dished seat 260 of reciprocal member 261 and shoulder 262 of housing portion 258, slide valve 255 will be in a position wherein groove 263 therein (FIG. 21) effects communication between aperture 254 and aperture 264 in the valve seat. Thus the manifold vacuum which exists in conduit 250 and conduit 252 will be caused to communicate with chamber 265 of governor 248 through slide valve groove 263, aperture 264, control valve conduit 266 (FIGS. 21 and 22), pressure regulating chamber 267 (FIG. 22), conduit 268 and valve conduit 269. The existence of manifold vacuum in chamber 265 will cause diaphragm 256 to move to the left in FIG. 20 and cause movable valve element 261 to move to the left also as guided by pins 270 thereof moving in guideways 271 formed integrally with housing portion 258. Movable valve element 261 has a central portion 272 having spiral tracks 273 therein in which projections 274 of shaft 275 ride. It will be appreciated that as movable valve element 261 moves to the left the reciprocatory motion thereof is converted to a rotary motion of shaft 275 because of the above-mentioned spiral connection. Shaft 275 is journaled for rotation in bore 276 which is formed integrally with housing portion 258 and has shaft 277 splined thereto at 278. The end of shaft 277 carries reduced portion 279 which fixedly mounts kicker element 280. The above-described movement to the left of diaphragm 256 will cause the rotation of kicker element 280 in a counterclockwise direction as viewed from FIG. 21 to the point where overcenter spring 281 snaps kicker element 280 to the position shown in FIG. 21, the overcenter spring 281 having one end thereof mounted on pin 282, which is secured to housing portion 258, and the other end thereof bearing on plate 283 mounted about link 284 having the lower end thereof formed into a groove 285 which receives pin 282 and the upper end thereof formed into a notch 286 which receives pin 287 mounted on kicker element 280. When kicker element 280 reaches the position shown in FIG. 21, shoulder 288 thereof will engage shoulder 289 of slide valve 255 and move it to the position shown in FIG. 21 from its previous position wherein groove 263 therein effected the above-described communication between chamber 265 and the engine intake manifold.

While diaphragm 256 is in the position shown in FIG. 20, that is before it moved to the left, contacts 289 and 290 of electrical overcenter switch 291 are in engagement to complete an electrical circuit to the wiper motor and thereby cause it to start through the same type of circuit as described above in FIG. 2. Switch 291 may be identical in construction to switch 120 of FIGS. 2 and 13. After diaphragm 256 has moved to the left under the influence of manifold vacuum in chamber 265, contacts 289 and 290 will separate to break the electrical circuit to the wiper motor because stem 296 has the end 297 thereof affixed to movable valve element 261 and the other end thereof formed into a headed portion 298 which engages end 299 of overcenter switch actuating lever 300. However, the motor will continue to run because its stopping circuit still provides it with electric current in the manner described above in detail in FIG. 2. However, after the wiper motor reaches its stopped position, it will remain in such position until contacts 289 and 290 again close to repeat the foregoing cycle.

It is to be noted that intermittent governor unit 248 has a chamber 292 therein which is to the right of diaphragm 256. This chamber becomes filled with air as diaphragm 256 moves to the left when chamber 265 is subjected to manifold vacuum because outer portion 293 of valve 294' unseats to permit air from the atmosphere to enter chamber 292 through aperture 294 and aperture 295. While the movement of diaphragm 256 to the left is almost instantaneous as soon as chamber 265 is subjected to vacuum, there is a delay which accompanies the return of diaphragm 256 to its position shown in FIG. 20. This delay measures the length of time which the wiper will dwell at the end of its stroke before again providing a cycle of operation. The delay is effected because after diaphragm 256 reaches its extreme position to the left in FIG. 20, kicker 280 will be moved to the position shown in FIG. 21 wherein it causes slide valve 255 to assume the position shown in FIG. 21. In this position aperture 264 in valve seat 253 will be exposed to the atmosphere through vents 301 in the governor housing, filtering material 302 and vent 303. Furthermore, an additional aperture 304 is provided in valve seat 253, aperture 304 being uncovered when slide valve 255 is in the position shown in FIG. 21. Aperture 304 is part of a conduit communicating directly with chamber 265. It is to be noted that slide valve 255 blocks off aperture 304 when said slide valve 255 is in a position where it effects communication between the engine intake manifold and chamber 265. When valve chamber 265 is vented in the foregoing manner, spring 259 will expand to return diaphragm 256 to the position shown in FIG. 20. However, as noted above, this movement is at a controlled rate because end 293 of valve 294' closes aperture 294 and the air in chamber 292 tends to be compressed and forced through nipple 305, conduit 306, T 307, conduit 308, nipple 309 of valve 230, valve chamber 310', metering aperture 311, chamber 312 and aperture 313 to the atmosphere. After diaphragm 256 reaches the position shown in FIG. 20, overcenter switch 291 will again close contacts 322, 289 and 290 to permit current flow in the wiper motor and cause the wipers to move from their resting position. Furthermore, as diaphragm 256 approaches its position shown in FIG. 20, kicker 280 will move in a clockwise direction so that shoulder 314 thereof will engage shoulder 315 of slide valve 255 to cause it to return to a condition wherein groove 263 therein again effects communication between apertures 254 and 264 and also closes off aperture 304 so that it no longer communicates with the atmosphere. As soon as manifold vacuum is again sensed in chamber 265, diaphragm 256 will again move to the left against the bias of spring 259 to thereby repeat the above-described action.

The length of dwell between successive cycles of wiper operation can be adjusted by the vehicle operator by manipulating knob 316 of manual control 230. A shoulder 317 is fixed to the end of knob 316 and is housed within chamber 318 of knob 231. A spring 319 biases knob 316 to the left in FIG. 20. A shaft 320 has one end thereof fixedly secured to knob 316 and the other end thereof threaded at 321 for mating engagement with tapped bore 322 of base plate 234. The rotation of knob 316 therefore results in axial movement of shaft 320 and the end 322 of this shaft abuts the end 323 of metering pin 310 which is biased to the left by spring 324 which is interposed between shoulder 325 in nipple 309 and collar 326 on metering pin 310. The main portion of metering pin 310 is tapered as indicated in FIG. 20 so that by moving this tapered portion relative to cylindrical bore 311 the rate of air flow through bore 311 can be controlled to thereby determine the length of time which it takes for diaphragm 256 to return to the position shown in FIG. 20 under the urging of spring 259. Thus the vehicle operator by a simple operation can adjust the period of dwell between successive cycles of wiper operation to fit the precise conditions of precipitation in which he is driving, that is, during relatively heavy precipitation the dwell cycle will be reduced and during relatively light precipitation the dwell cycle will be increased.

In accordance with the above-noted aspect of the present invention relating to the shifting of the wiper system from a condition of intermittent operation to a condition of continuous operation whenever the vehicle is accelerated, the following structure is provided. A valve 244 (FIG. 20) has one end thereof in communication with conduit 242' leading from the engine intake manifold. This valve includes a body portion 327 having conduit 328 therein leading to chamber 329 which houses spring 330 having one end thereof in abutment with shoulder 331 of conduit 328 and the other end thereof in abutment with valve element 332. Housing 327 also has nipple 333 leading from aperture 334 which is normally closed by valve element 332. nipple 333 mounting conduit 335 which leads to T 307. Whenever the manifold vacuum in conduit 242' is sufficiently high, as when the vehicle is not being accelerated, valve element 332 will be maintained on its seat 336 against the bias of spring 330. However, when there is a decrease in manifold vacuum which accompanies vehicle acceleration, spring 329 will pop valve element 332 from seat 336 to thereby permit atmosphere to communicate with conduit 335 through vent 337, filtering material 338, chamber 339 and nipple 333. The atmosphere will therefore be in communication with chamber 292 of governor 248 through conduit 335, noted above, T 307, conduit 305 and nipple 305. Furthermore chamber 265 to the left of diaphragm 256 will also be vented through valve 244 because the unseating of valve element 332 permits the atmosphere to communicate with conduit 328 and conduit 245, the latter leading to conduit 246 of manual valve 230. As noted above, the conduit 246 is in communication with chamber 265 through valve groove 240, conduit 250, and the other conduits 251 etc. In the housing of governor 248, described in detail above, leading to chamber 265. The existence of atmospheric pressure in chamber 292 to the right of diaphragm 256 and in chamber 265 to the left of diaphragm 256 will permit spring 259 to bias diaphragm 256 to the right to the position shown in FIG. 20. This action will cause contacts 289 and 290 of overcenter switch 291 to close and thereby complete an electrical circuit to the wiper motor to cause it to run continuously in response to the acceleration of the vehicle which, as noted above, causes valve element 332 of valve 244 to unseat. Upon the return of a higher manifold vacuum in the engine intake manifold, valve element 332 of valve 244 will return to its seat 336 against the bias of spring 330 and thereby terminate the above described venting. This will cause the vacuum of the engine intake manifold to again communicate with chamber 265 to the left of diaphragm 256 whereupon the above described intermittent wiper operation will again be resumed until such time as the vehicle is again accelerated, whereupon the system will again shift from a condition of intermittent operation to a condition of continuous operation.

Valve 244 of FIG. 20 inherently provides a period of continuous wiper motor operation after the vehicle has terminated its acceleration. This is accomplished by causing valve element 332 to unseat at a lower manifold pressure than it reseats. More specifically, when a predetermined low manifold pressure value is experienced during acceleration, spring 330 will pop valve element 332 from its seat 336. However, it is to be noted that there is a clearance between the sides of valve element 332 and the walls of the chamber in which it rides. Therefore, a much higher manifold vacuum is required to pull valve element 332 back to seat 336 than was required to permit it to unseat because of the leakage past the sides of the valve element. Therefore, it can readily be seen that valve element 332 unseats when a certain low manifold vacuum is experienced incidental to vehicle acceleration, but valve element 332 will not reseat until the much higher manifold vacuum is experienced after acceleration is terminated. The foregoing structure, therefore, provides the necessary time delay which is desired for maintaining the wiper motor operating continuously during acceleration and for the short period thereafter.

FIG. 22 depicts a pressure regulating mechanism which ensures that intermittent dwell governor 248 will operate under all conditions of manifold vacuum because the mechanism of FIG. 22 not only regulates the pressure, but also reduces it. It is to be especially noted that the various parts of the pressure regulating mechanism shown in FIG. 22 are not shown in the same relationship in FIGS. 20 and 21, this change being in the interest of clarity. In other words, certain of the conduits have been shifted for ease of understanding and these portions of the drawings may, therefore, be considered to be schematic. From FIG. 22 it can be seen that conduit 266 leading from the engine intake manifold has end 350 thereof in communication with chamber 267. A spring 351 biases flexible diaphragm 352 to the right in FIG. 22. The other side of diaphragm 352 is subjected to the atmosphere through aperture 353. It will be appreciated that the action of spring 351 and the magnitude of manifold vacuum to the left of diaphragm 352 in combination with the atmosphere acting on the other side of diaphragm 352 will determine the position of said diaphragm. The closeness of diaphragm 352 to end of conduit 266 will effect pressure regulation in the sense that as manifold vacuum increases, diaphragm 352 will be closer to end 350 and, as it decreases, it will be further from end 350. Because of foregoing action, the pressure in conduit 268 leading from chamber 267 will remain substantially constant. A metering pin 354 is threaded into housing portion 258 and has a tapered end 355 which co-acts with a cylindrical bore 356 to reduce the pressure in conduit 269 leading to chamber 265 of intermittent dwell unit 248. Thus, by adjusting metering pin 354, the amount of pressure ultimately sensed in chamber 256 may be adjusted. The pressure regulation, noted above, permits identical operation of diaphragm 256 under all conditions of manifold vacuum within a prescribed range because it is responsive to a certain low pressure which is always available, except during the above-described venting.

It is to be especially noted that in the embodiments of the invention for shifting the wiper system from intermittent operation to continuous operation in response to the sensing of the drop in manifold vacuum, as in the embodiments of FIGS. 2, 14, and 20, the operator is provided with automatic control of the system for effecting the above noted shifting. More specifically, in response to the initial decrease in manifold vacuum, the systems of the above noted figures will shift from intermittent operation to continuous operation. After there is a return to higher manifold vacuum, there will be a certain time delay during which the wiper system will operate continuously before it reverts to intermittent operation. However, if at any time during this delay, the vehicle is again accelerated, there will be a corresponding drop in manifold vacuum which will cause the system to operate continuously while said low manifold vacuum exists because the low vacuum will reset the intermittent dwell control to provide an additional time delay before it reverts to intermittent operation. It is to be especially noted that during the foregoing resetting action there is no loss of continuity of wiper motor operation. Thus, the vehicle operator is provided with automatic shifting from intermittent operation to continuous operation with a presettable extension of wiper continuity which is repeatable by the vehicle operator when he depresses the accelerator pedal while the wiper system is still operating continuously.

Control 230 of FIG. 20 possesses an arrangement for permitting a calibration of metering pin 310 in an expedient manner. More specifically, a plug 324' is provided with an outer threaded portion 325' which is received in tapped portion 326' of housing portion 327'. In order to calibrate control 230, manual knob 316 is rotated in a first direction until it reaches the limit of its travel. Thereafter, plug 324' is threaded into housing portion 327' until such time as the end 323 of metering pin 310 abuts the end 323 of shaft 320. Continued rotation of plug 324' will result in metering pin 310 being moved toward the right in FIG. 20. This movement, which results from the aforesaid rotation is continued until a desired clearance is obtained between metering pin 310 and aperture 311 at the end of plug 324'. This will provide the maximum length of time for air to bleed through aperture 311, as described in detail above, to provide a period of wiper dwell between successive cycles of operation. It will readily be appreciated that when control knob 316 is moved from the end limit of its travel to move metering pin 310 to the right against the bias of spring 324, the period of dwell will be decreased. When plug 324' has been threaded into housing portion 327' the amount which is required to obtain the above described maximum dwell, a nut 328' is tightened on threads 325 until said nut abuts the end of housing 327' to thereby lock plug 324' in its calibrated position. The structure which provides the minimum and maximum clearance between metering pin 310 and aperture 311 is a projection 329' on washer 330' which is keyed into base plate 234', in conjunction with a struck-up portion 331' on shaft 320. It can readily be seen that rotation of shaft 320 is limited in a first direction when one side of struck-up portion 331' abuts one side of projection 329' and that rotation of shaft 320 is limited in the other direction when the other side of struck-up portion 331' abuts the other side of projection 329'. Actually, in practice, rotation of shaft 320 is limited by the foregoing means to approximately 320°. The limit of travel referred to in the preceding paragraph for setting the maximum period of dwell is determined when one side of struck-up portion 331' abuts projection 329' when shaft 320 has been rotated in the direction which will cause it to move its maximum amount to the left in FIG. 20.

While not specifically illustrated in the drawings, it is to be understood that the instant invention may be modified to control either a vacuum, hydraulic, or air pressure wiper motor. With each of the foregoing types of motors, a first manually actuated control can be used to cause said motors to provide continuous cycling action, in the well known manner. In addition, for providing intermittent operation, it is only necessary to cause the switch, such as 291 of FIG. 20 or 120 of FIG. 2 to be in a circuit with a solenoid which is coupled to the conventional throttle valve of the above mentioned types of motors. When switches 291 or 120 of FIGS. 20 or 2, respectively, are closed, the solenoid is energized to maintain the throttle valve of the above types of motors in a position which causes wiper motor operation. However, when switches 291 or 120 are opened, a spring in the solenoid biases the wiper motor throttle valve to a position which causes the wiper motor to come to rest. It can readily be seen, therefore, that every time the contacts of switches 291 or 120 close in response to the normal operation of intermittent dwell governors 248 or 126, respectively, a cycle of wiper motor operation will be obtained and when said switches 291 and 120 open, the wiper motors will come to rest for a length of time which depends on the above-described action of the intermittent dwell governor. It will be further appreciated that during conditions of vehicle acceleration, the intermittent dwell governors 248 and 126 of FIGS. 20 and 2, respectively, will occupy the positions shown in the drawings wherein the solenoid associated with the motor throttle valve will cause continuous cycling of wiper motors. In lieu of the solenoid actuation described above for actuating the throttle valve of the above mentioned types of fluid motors, a fluid pressure actuated coupler may be used which may be, in turn, energized by a valve which is substituted for the electric switches 291 and 120 of FIGS. 20 and 2, respectively. The fluid pressure actuated coupler is essentially a motor consisting of a piston and cylinder, or equivalent arrangement. In the latter type of installations, the valve which is substituted for electric switches of the intermittent dwell governors causes the coupler associated with the wiper motor throttle valve to be in communication with a source of fluid pressure when the intermittent dwell governors are in the positions shown in FIGS. 20 and 2. Under this condition, the coupler will move the motor throttle valve of the above described types of fluid pressure motors to a position wherein the wiper motor will operate. However, when the intermittent dwell governors are moved from the positions shown in FIGS. 20 and 2, the valve, which has been substituted for the electrical switch, will cause the coupler to be vented and the coupler, through a biasing spring therein, will return the throttle valve to a motor rest position. It will thus be appreciated that the intermittent dwell governors shown in FIGS. 2 and 20, with the described modifications noted above, may be used to control the operation of fluid pressure wiper motors of the hydraulic, vacuum or air pressure type.

The structures of the present invention are coordinated to shift the wiper system from a condition of intermittent operation to a condition of continuous operation in response to the acceleration of the vehicle. Furthermore, whether the wiper is operating continuously or whether it is operating intermittently, it may be set to travel across the windshield at the same wiping velocity. By varying the frequency of dwell, a single speed wiper motor may be used to convert a wiper system normally limited to fixed geared down single and unalterable constant rate of cycling, with its attendant undesirable monotony of motion, into a wiper system affording the advantage of matching the weather with a wiping selectivity in a new mode of obtaining better vision using the blade to clear by cycling with variable wiping frequency to add air evaporation gained by car speed in between cycles without blowing the velocity of the blade thereby obviating the otherwise unavoidable blade chatter resulting from cling which accompanies slow blade travel.

It can thus be seen that the various embodiments of the present invention are manifestly capable of achieving the above enumerated objects, and while preferred embodiments of the present invention have been described, it is to be understood that the present invention is not to be limited thereto, but may be otherwise embodied within the scope of the following claims.

What is claimed is:

1. A windshield wiper system for a vehicle comprising a wiper, a wiper motor, means coupling said wiper to said wiper motor, first selectively operable control means for causing said wiper motor to drive said wiper continuously, second selectively operable control means for causing said wiper motor to drive said wiper intermittently with an intervening rest period between cycles of wiper operation, and auxiliary means automatically operable during periods of response to the increasing of the engine speed of said vehicle for causing said wiper motor to drive said wiper continuously notwithstanding that said second control means are set in position to provide intermittent wiper operation.

2. A windshield wiper system as set forth in claim 1 including time delay means operatively associated with said auxiliary means for causing said wiper motor to tend to drive said wiper continuously temporarily while holding an open throttle for maintaining said speed of said vehicle and for thereafter returning said system to a condition wherein said second control means cause the motor to resume intermittent wiper operation.

3. A windshield wiper system for a vehicle comprising a wiper, a wiper motor, means coupling said wiper to said wiper motor, first means selectively operable for causing said wiper motor to drive said wiper intermittently with an intervening rest interval between cycles of wiper operation, and second means automatically responsive while increasing the speed of said vehicle for causing said wiper motor to drive said wiper continuously notwithstanding that said first means are set in position to provide intermittent wiper operation.

4. A windshield wiper system as set forth in claim 3 including time delay means operatively associated with said second means for causing said wiper motor to drive said wiper continuously for an interval of time after the increasing of said speed of said vehicle has terminated and for thereafter returning said system to a condition wherein said first means resume intermittent wiper motor operation.

5. A windshield wiper system for a vehicle comprising a wiper, a wiper motor, means coupling said wiper to said wiper motor, first means selectively operable for causing said wiper motor to drive said wiper intermittently with an intervening rest interval between cycles of wiper operation, second means operable in response to an initial acceleration of said vehicle for causing said wiper motor to drive said wiper continuously during said acceleration and for a first period of time after said acceleration has terminated, said second means being resettable in response to a successive acceleration of said vehicle to terminate said first period before it is completed and to provide an additional period of continuous wiper motor operation after said successive acceleration of said vehicle has terminated without disrupting the continuity of wiper motor operation, whereby a total period of continuous wiper motor operation may be obtained which is in excess of said first period.

6. An intermittent dwell governing unit for a windshield wiper system comprising a housing, a solenoid in said housing, said solenoid including a winding and an armature, switch means coupled to said armature, said switch means assuming a normally closed position before said solenoid is energized, circuit means for coupling said winding to a source of electric current through said switch means whereby said solenoid is energized when said switch means are closed and de-energized upon the opening of said switch means in response to the movement of said armature, and time delay means in said housing for returning said armature to a position wherein it effects closing of said switch means after the de-energization of said solenoid.

7. An intermittent dwell governing unit as set forth in claim 6 wherein said time delay means comprises a chamber in said housing, a movable member constituting a wall of said chamber, means for coupling said movable member to said armature whereby said movable member is moved in a first direction upon the energization of said solenoid, spring means for biasing said movable member in a second direction which is opposite to said first direction whereby said movable member and said armature are returned to the position which they occupied before said solenoid was energized after said solenoid is de-energized, and controlled bleed means operatively associated with said chamber for controlling the rate at which air bleeds relative to said chamber after said solenoid is de-energized by the opening of said switch means to thereby determine the length of time that said switch means will remain open after the energization of said solenoid.

8. A fluid pressure operated intermittent dwell governor unit comprising a housing having first and second chambers therein separated by a movable member, valve means for effecting intermittent communication between a source of fluid pressure and said first chamber and thereafter venting said first chamber, said movable member being movable in a first direction in response to the subjecting of said first chamber to said source of fluid pressure through said valve means, spring means for biasing said movable member in a second direction which is opposite to said first direction when said first chamber is vented, controlled bleed means operatively associated with said second chamber to discharge fluid therefrom at a controlled rate when said movable member moves in said second direction under the urging of said spring means, and energy conducting means operatively coupled to said movable member for permitting communication between a source of energy and a wiper motor before said first chamber is placed in communication with said source of fluid pressure and for terminating said communication after said movable member has moved in response to the existence of fluid pressure in said first chamber and for re-establishing said communication between said energy source and said wiper motor after said movable member returns to the position it occupied before said first chamber was subjected to fluid pressure.

9. A fluid pressure intermittent dwell governing unit comprising a housing, chamber means in said housing, valve means associated with said housing for selectively placing said chamber means in communication with a source of fluid pressure, a movable wall forming a portion of said chamber means, said movable wall being deflected in response to the subjecting of said chamber means to said source of fluid pressure, linkage means coupling said valve means to said movable wall whereby said valve means effect venting of said chamber means after said movable wall has moved from its original position, biasing means operable after said venting for returning said movable wall to the original position it occupied before said chamber means were subjected to said source of fluid pressure, controlled bleed means operatively associated with said housing for regulating the rate at which said movable wall returns to the original position it occupied before said chamber means were subjected to said source of fluid pressure, said linkage means causing said valve means to reestablish said communication between said source of fluid pressure and said chamber means after said movable wall has returned to the original position it occupied before said chamber means were initially placed in communication with said source of fluid pressure, and energy conducting means adapted to be actuated by said movable wall for providing communication between a source of energy and a wiper motor when said movable wall is in its original position before said chamber means are subjected to said source of fluid pressure and for terminating said communication between said source of energy and said wiper motor after said movable wall has moved from its original position in response to the subjecting of said chamber means to said source of fluid pressure, said energy transferring means being ineffective for supplying said wiper motor from said source of energy until such time as said movable wall returns to its original position under the urging of said biasing means.

10. A windshield wiper system for a vehicle comprising a wiper, an electric wiper motor, means coupling said wiper to said wiper motor, an automatic pneumatically harnessed governor operative to cause said wiper motor to drive said wiper intermittently with an intervening rest period between cycles of wiper operation, and a selective manually actuatable control for both setting said automatic governor to cause said wiper system to operate intermittently and for selectively causing said automatic governor to vary the period of dwell between cycles of wiper operation.

11. A windshield wiper system as set forth in claim 10 wherein said automatic governor includes a fluid chamber with a movable wall, wiper actuating means operatively coupled to said movable wall for causing said wiper motor to drive said wiper in response to the setting of said manually actuatable control for intermittent operation, means in said automatic governor for moving said movable wall and thereby terminating the driving of said wiper, biasing means operatively associated with said movable wall for returning it to a position wherein said wiper actuating means re-establish the driving of said wiper by said motor, a conduit effecting communication between said chamber and said manually actuatable control, and adjustable metering means operatively associated with said manually actuatable control for determining the rate which fluid bleeds relative to said chamber in response to the movement of said movable wall by said biasing means to thereby determine the length of time required for said movable wall to return to its original position wherein it causes said wiper actuating means to re-establish said driving of said wiper, the adjustment of said metering means determining the interval of wiper dwell between cycles of wiper operation.

12. A windshield wiper system as set forth in claim 11 wherein said means in said automatic governor for moving said movable wall comprise a solenoid with an armature coupled to said movable wall and switch means operative to energize said solenoid while said movable wall is in its original position, but inoperative to energize said solenoid after said movable wall has moved from its original position.

13. A windshield wiper system as set forth in claim 11 wherein said means in said automatic governor for moving said movable wall comprise a second fluid pressure chamber, valve means coupled to said movable wall for effecting communication between a source of fluid pressure and said second fluid pressure chamber when said movable wall is in its original poistion, said valve means terminating said communication after said movable wall has moved from its original position to thereby permit said biasing means to return said movable wall to its original position, said coupling between said movable wall and said valve means re-establishing said communication after said movable wall returns to its original position.

14. A windshield wiper system for a vehicle comprising a wiper, a wiper motor and gearing for driving said wiper at a determined substantially constant cycling velocity, selectively operable means for causing said wiper motor to optionally drive said wiper intermittently with an intervening presettable substantially uniform rest interval of dwell between cycles of maintained wiper operation at said velocity, adjustable means for presetting the duration of dwell in said rest interval to thereby fix the frequency of the wipe cycle and coordinated auxiliary control means operable in response to the actuation of the engine throttle to automatically increase the frequency of said cycles of wiper blade operation at said substantially constant velocity.

15. A windshield wiper system as set forth in claim 14 wherein said increased frequency of wiper blade cycling is decreased in response to the engine throttle deceleration, said fixed wiper velocity being maintained during both said increased and decreased frequencies of wiper operation.

16. A windshield wiper system for a motor vehicle comprising a wiper, a wiper motor for driving said wiper at a substantially constant velocity, first means selectively operable for causing said wiper motor to drive said wiper intermittently with an intervening rest interval of dwell between cycles of wiper operation at said velocity, second means for presetting the duration of dwell during said rest interval including adjustable timing means to regulate the frequency of said cycles of wiper operation at said velocity, and coordinated auxiliary control means operable in response to engine operation to increase vehicle speed to automatically increase the frequency of wiper blade cycling at said velocity, said coordinated auxiliary means including means to automatically cause said wiper to resume its intermittent operation at said velocity following said automatic increase in frequency.

17. A windshield wiper system for a vehicle comprising a wiper, a wiper motor for driving said wiper at a substantially fixed velocity, selectively operable means for causing said wiper motor to drive said wiper intermittently with an intervening rest interval of dwell between cycles of wiper operation at said fixed velocity, adjustable means for presetting the duration of dwell in said rest interval, and coordinated auxiliary control means operable in response to the increasing speed of vehicle to automatically increase the frequency of said cycles of wiper blade operation at said fixed velocity.

18. A windshield wiper system for a vehicle comprising a wiper, a power train for driving said wiper, said power train comprising driving means for producing rotary motion, power supply means for providing continuous power for said driving means and motion transmitting means for coupling said driving means to said wiper to produce oscillatory motion of said wiper; and manually presettable, cyclic timing control means incorporating mechanical camming motion for interrupting said power train to automatically effect periodic actuation of said wiper intermittently.

19. A windshield wiper system having a rotary wiper motor, a power source for energizing said wiper motor, means coupling said power source to said rotary wiper motor, a wiper driven thereby, rotational, cyclic timing engaging means responsive to mechanical motion for causing said wiper to be driven intermittently, including a rest interval at the end of cycling wiper operation and dwell control means for presetting said timing engaging means.

20. A windshield wiper system for a vehicle comprising a wiper, a rotary wiper motor, circuit means including means for connecting said motor in circuit to a source of electrical energy for excitation of said rotary wiper motor, manually presettable, mechanical, optionally usable cyclic timing engaging means for effecting interruption of operation of said wiper for a preset interval following wiping operation to automatically produce periodic actuation of said wiper intermittently and auxiliary means operable independently of the flow of said motor energy excitation circuit means for actuating said cyclic timing engaging means.

21. Intermittent dwell governing apparatus comprising a manually presettable, mechanical, cyclic timing control device, said control device including a movable element and auxiliary means for actuating said movable element from a first position to a second position at presettable intervals, for a mechanically measured duration of time and power transmitting means for actuating a rotary motor driven wiper, said movable element being coupled to said power transmitting means and operative to couple said power transmitting means and said rotating machine driven wiper when in said first position and operative independently of said power transmitting means to uncouple said power transmitting means from said rotating machine driven wiper when in said second position.

22. Intermittent dwell governing apparatus comprising a manually presettable, mechanical, cyclic timing control device, said control device including a movable element and auxiliary power means for actuating said movable element from a first position to a second position at preset intervals for a preset duration of time and energy conducting means operatively coupled to said movable element for permitting communication between a source of energy and a wiper motor before said movable element is moved to said second position and for terminating said communication after said movable element has moved to said second position and for reestablishing said communication between said energy source and said wiper motor after said movable element returns to said first position, said auxiliary power means being indirectly operative independently of said energy conducting means and said source of energy.

References Cited in the file of this patent

FOREIGN PATENTS 521,182    Italy ___________________ Mar. 25, 1955